US009736202B2

(12) United States Patent
Park et al.

(10) Patent No.: US 9,736,202 B2
(45) Date of Patent: *Aug. 15, 2017

(54) PARALLEL STREAMING (71) Applicant: NETFLIX, Inc., Los Gatos, CA (US)

(72) Inventors: Anthony N. Park, San Jose, CA (US); Neil D. Hunt, Los Altos, CA (US); Wei Wei, Fremont, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,348

(22) Filed: Feb. 23, 2015

(65) Prior Publication Data

US 2015/0172339 A1    Jun. 18, 2015

Related U.S. Application Data (63) Continuation of application No. 13/777,241, filed on Feb. 26, 2013, now Pat. No. 8,966,014, which is a continuation of application No. 12/722,580, filed on Mar. 12, 2010, now Pat. No. 8,386,621.

(51) Int. Cl.
*G06F 15/16* (2006.01)
*H04L 29/06* (2006.01)
*H04L 29/08* (2006.01)

(52) U.S. Cl.
CPC ...... *H04L 65/4069* (2013.01); *H04L 65/4084* (2013.01); *H04L 65/607* (2013.01); *H04L 65/80* (2013.01); *H04L 67/10* (2013.01); *H04L 69/14* (2013.01); *H04L 65/60* (2013.01)

(58) Field of Classification Search
CPC ........................................................ H04L 65/60
USPC ................................................... 709/218, 219
See application file for complete search history.

(56) References Cited

U.S. PATENT DOCUMENTS

| 5,761,417 | A | * | 6/1998 | Henley .................. G06F 3/061 709/231 |
| 7,096,263 | B2 | | 8/2006 | Leighton et al. |
| 7,299,291 | B1 | | 11/2007 | Shaw |
| 2007/0260546 | A1 | | 11/2007 | Bataiden et al. |
| 2007/0288588 | A1 | | 12/2007 | Wein et al. |

FOREIGN PATENT DOCUMENTS

WO    2009020552 A1    2/2009

OTHER PUBLICATIONS

European Search Report dated Oct. 6, 2015 in Application No. 11 75 4234.

(Continued)

*Primary Examiner* — Adnan Mirza
(74) *Attorney, Agent, or Firm* — Artegis Law Group, LLP (57) ABSTRACT Embodiments of the present invention set forth techniques for a content player to stream a media file using multiple network connections. To stream the media file, the content player downloads metadata associated with a requested media file, establishes a network connection with multiple content servers (or multiple network connections with a single content server or both) and begins requesting portions of the media file. In response, the requested portions are transmitted to the content player. The content player may employ a predictive multi-connection scheduling approach to determine which network connection to use in downloading a given chunk.

21 Claims, 9 Drawing Sheets

(56) References Cited

OTHER PUBLICATIONS

International Search Report for Application No. PCT/US11/28240 mailed May 5, 2011.
D1: Main_Page—Theory.org Wiki [retrieved Jul. 16, 2013] Retrieved from internet. <URL: hllp://web.archive.org/web/20100125062008/hllp://wiki.lheory.org/Main_Page> as published on Jan. 25, D 2010 as per Wayback machine.
D2: Bi!TorrentSpecification—Theory.org Wiki [retrieved Jul. 3, 2013] Retrieved from internet. <URL: hllp://web.archive.org/web/20090221115910/hllp://wiki.lheory.org/Bi!TorrentSpecification> as published on Sep. 21, D 2009 as per Wayback machine.
D3: Bi!TorrentFAQ—Theory.org Wiki [retrieved Jul. 16, 2013] Retrieved from internet. <URL: hllp://web.archive.org/web/20100131200424/hllp://wiki.lheory.org/Bi!TorrentFAQ> as published on Jan. 31, D 2010 as per Wayback machine.
Australian Patent Examination Report dated Jul. 17, 2013.

* cited by examiner

PARALLEL STREAMING

CROSS-REFERENCE TO RELATED APPLICATION

This application is a continuation of co-pending U.S. Patent Application entitled "Parallel Streaming", Ser. No. 13/777,241, filed Feb. 26, 2013, which is a continuation of U.S. Patent Application entitled "Parallel Streaming", Ser. No. 12/722,580 filed Mar. 10, 2010, now patented as U.S. Pat. No. 838,662, Issued Feb. 26, 2013, which are hereby incorporated herein by reference.

BACKGROUND OF THE INVENTION

Field of the Invention

Embodiments of the present invention relate generally to digital media and, more specifically, to a digital content distribution system for streaming a digital content file, in parallel, using multiple connections to a content distribution network.

Description of the Related Art

Digital content distribution systems typically include a content server, a content player, and a communications network connecting the content server to the content player. The content player may be configured to playback, e.g., movies, televisions shows, sporting events, music productions, etc, as stored in a digital content file.

In practical scenarios, a group of content servers may be configured within a communications network to form a content distribution network (CDN). The content distribution network may also include a directory server configured to provide a list of titles of available from the CDN and associate each title with a reference mechanism, such as a uniform resource locator (URL), used to access the title. When a user interacts with the content player to initiate playback of a specific title, the content player may post a request to the directory server for a reference to content servers hosting the file. Note, the files are often hosted by multiple content servers. The content player then downloads and plays the title from the CDN using the reference provided by content directory server.

The process of playing the digital content file includes decoding the data to generate audio and video signals sent to audio speakers and a display screen. Playback typically occurs using a technique known as "streaming," where the content is transmitted over the network to the content player, which decodes and plays the media file while data is being received. To account for variable latency and bandwidth within the communications network, a content buffer queues some of the audio/video data ahead of the content data actually being played. During moments of network congestion, which leads to lower available bandwidth, less audio/video data is added to the buffer, which drains down as content data is being de-queued during streaming playback. However, during moments of high network bandwidth, the buffer is replenished, adding data to the buffer. In practical systems, the content buffer may queue content data corresponding to a time span ranging from seconds to more than a minute.

Streaming media files over the Internet has become increasingly popular as the availability of broadband data communication services has improved. As is known, the playback quality of a program depends significantly on the bit-rate at which the video is encoded. In digital audio and video applications, bit rate refers to the number of data bits used per unit of playback time to represent audio and video. In general, the higher the bit-rate the higher the visual and auditory quality of a program and the longer it takes to download a portion of the program over a data network at a fixed bandwidth or transmission rate. The better the throughput that can be achieved using the network bandwidth available to a content player, the higher a bit-rate encodings that may be used for playback. Further, the better the throughput of a connection, the less likely it is that a buffer under-run will occur (i.e., the less likely that streaming playback will be interrupted).

SUMMARY OF THE INVENTION

One embodiment of the present invention includes a method for downloading, in parallel, a digital content file using a plurality of network connections. This method may generally include receiving a list of one or more content servers hosting a copy of the digital content file, establishing the plurality of network connections with the one or more content servers, and receiving metadata describing a plurality of sequential portions of the digital content file. Each time one of the network connections is determined to be idle, one of the portions of the digital content file may be selected to be downloaded over the idle network connection and the selected portion is downloaded from the content server using the idle network connection. This method may also include storing each downloaded portion of the digital content in a content buffer and playing back the portions of content downloaded and stored in the content buffer.

In a particular embodiment, the step of selecting one of the portions of the digital content file to be downloaded over the idle network connection may itself include predicting a first time required to download a next sequential portion of the digital content file and predicting at least a second time required for each active network connection to complete downloading one of the portions of the digital content file and to complete downloading the next sequential portion. This method may further include tentatively assigning the next sequential portion to be downloaded using the network connection with the lowest predicted time. In response to determining the tentative assignment has been made to the idle network connection, the tentative assignment may be confirmed. Otherwise, in response to determining the tentative assignment has not been made to the idle network connection, the predicting steps may be repeated using a second next sequential chunk until a portion of the digital content file is assigned to the idle network connection.

Still another embodiment of the invention provides a method for downloading, in parallel, a digital content file using a plurality of network connections. This method may generally include receiving a list of one or more content servers hosting a copy of the digital content file, and launching, for each of the plurality of network connections, a buffering thread. Each buffering thread may be configured to establish one of the network connections, download portions of the digital content file assigned by the scheduling thread, and store the downloaded portions in a content buffer. This method may further include launching a scheduling thread configured to select which network connection to use in downloading each of a plurality of portions of the digital content file and launching a playback thread configured to play the digital content stored in the content buffer.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide a technique for downloading a digital content file, in parallel, using multiple network connections established with a content distribution network (CDN). By creating multiple network connections, a better throughput is obtained for streaming a media file to the content player. To stream the media file, the content player downloads a file header associated with a given title, establishes a network connection with multiple content servers (or multiple network connections with a single content server or both) and begins requesting portions of the digital file (referred to as "chunks"). In response, the content servers transmit the requested portions to the content player. As described in greater detail below, the content player may employ a predictive multi-connection scheduling approach to determine which network connection to use in downloading a given chunk. Once received, the chunks may be stored in a buffer prior to being decoded and played back.

The predictive multi-connection scheduling approach maximizes the throughput of data for streaming the media file to the client, which may allow higher bit-rate encodings to be streamed, as well as reduce the occurrence of buffer under-runs, thereby improving the overall user experience.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
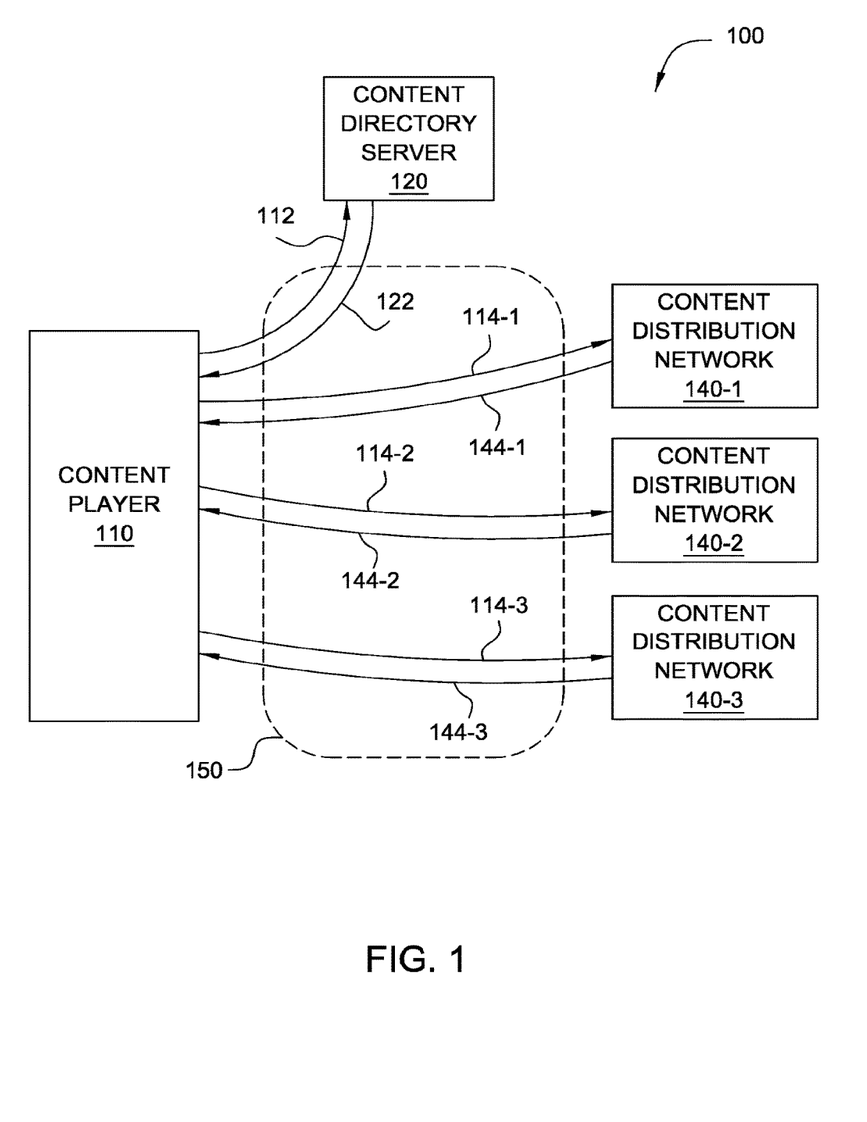
FIG. 1 illustrates a content distribution system configured to implement one or more aspects of the present invention.

FIG. 1 illustrates a content distribution system 100 configured to implement one or more aspects of the present invention. As shown, the content distribution system 100 includes, without limitation, a content player 110 configured to select a digital content file for playback from one of a plurality of content distribution networks 140. A content directory server 120 is configured to provide the content player 110 with a list of content distribution networks hosting the digital content file. A communications network 150, such as the internet communications network, provides the communication infrastructure for communication between the content player 110, content directory server 120, and the content distribution networks 140.

The content player 110 may be a computer system, a set top box, a mobile device such as a mobile phone, or other computing platform that has network connectivity and is coupled to or includes a display device. Each content distribution network (CDN) 140 comprises at least one computer system configured to service download requests for digital content files from the content player 110. The digital content file may include any type of encoded (or un-encoded) digital content (data), including, without limitation, movie content, television program content, or audio content. The digital content files may reside on a mass storage system accessible to the computer system, including, without limitation, direct attached storage, network attached file storage, or network attached block-level storage. The digital content files may be formatted and stored on the mass storage system using any technically feasible technique. Any data transfer protocol, such as hypertext transfer protocol (HTTP), may be used to download digital content files from the CDN 140 to the content player 110.

In a practical setting, a plurality of content players 110 connect to a plurality of CDNs 140. A content directory server 120 may be used to direct a given content player 110 to a specific CDN 140 from which to download a requested digital content file. The content directory server 120 may reside at a network address known to the plurality of content players 110. The network address may comprise a specific internet protocol (IP) address or a specific universal resource locator (URL), or any other technically feasible network address.

The communications network 150 may include a plurality of network communications systems, such as routers and switches, which enable data communication between the content player 110 and the plurality of content distribution networks 140. Persons skilled in the art will recognize that many technically feasible techniques exist for building the communications system 150, including the widely used TCP/IP protocols (and higher-layer application protocols) used by the internet.

In one embodiment, the content player 110 may transmit a title lookup request 112 to the content directory server 120. The title lookup request 112 may refer to the title of a particular digital content file, such as "Gone with the Wind." In response to the title lookup request 112, the content directory server 120 generates and transmits a CDN list 122 to the content player 110. The CDN list 122 specifies one or more CDNs 140 that each host a copy of the digital content file named in the title lookup request 112. For a given title, each CDN list 122 may be different for each content player 110, and a given content player 110 may receive a different CDN list 122 for each different requested title.

In one embodiment, each CDN 140 within the CDN list 122 includes a list of URLs of individual content servers within the CDN 140. Upon receiving the CDN list 122, the content player 110 selects at least one CDN 140 from which to download the digital content file named in the title lookup request 112. For example, the content player 110 may establish multiple connections with a single content server, but may also establish network connections with different content servers in one CDN 140, or content servers within multiple CDNs 140. Once the content server (or servers) is selected, the content player 110 proceeds to download chunks of the requested file, and play the digital content file named in the title lookup request 112.

Although the above description shows the content distribution system 100 with one content player 110 and three CDNs 140, persons skilled in the art will recognize that the architecture of FIG. 1 contemplates only an exemplary embodiment of the invention. Other embodiments may include any number of content players 110 and/or CDNs 140. Thus, FIG. 1 is in no way intended to limit the scope of the present invention.

Figure 2:
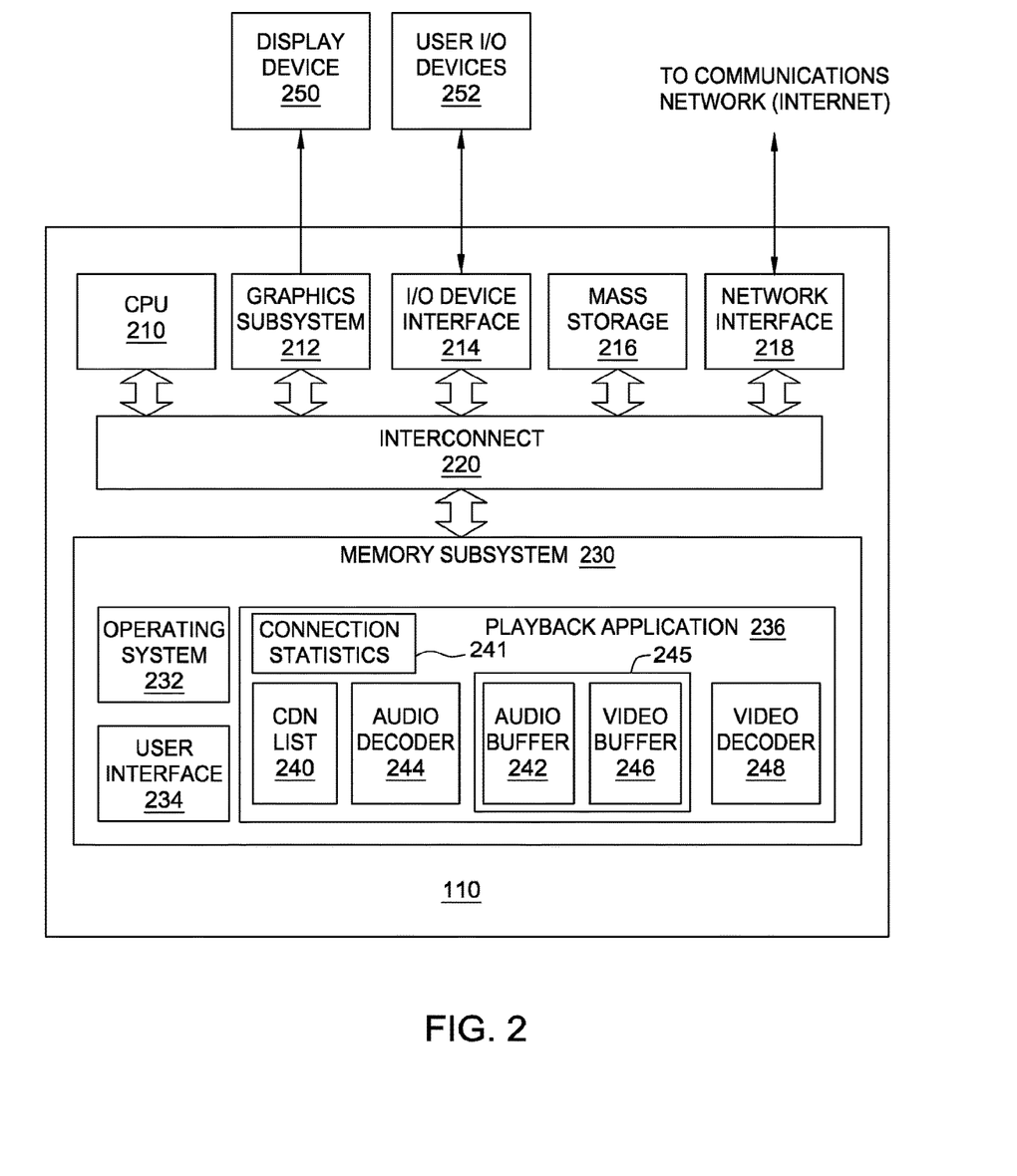
FIG. 2 is a more detailed view of the content player of FIG. 1, according to one embodiment of the invention.

FIG. 2 is a more detailed view of the content player 110 of FIG. 1, according to one embodiment of the invention. As shown, the content player 110 includes, without limitation, a central processing unit (CPU) 210, a graphics subsystem 212, an input/output (I/O) device interface 214, a network interface 218, an interconnect 220, and a memory subsystem 230. The content player 110 may also include a mass storage unit 216. The central processing unit (CPU) 210 is configured to retrieve and execute programming instructions stored in a memory subsystem 230. The CPU 210 retrieves the programming instructions from the memory subsystem 230 via an interconnect 220. The CPU 210 is configured to store and retrieve data in the memory subsystem 230 via the interconnect 220.

The graphics subsystem 212 is configured to generate frames of video data, such as a sequence of graphics images, and transmit the frames of video data to display device 250. The graphics subsystem 212 is coupled to the CPU 210 via the interconnect 220. In one embodiment, the graphics subsystem 212 is integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic) to produce a visual representation of the frames of video data. An input/output (I/O) device interface 214 is configured to receive input data from user I/O devices 252 and transmit the input data to the CPU 210 via the interconnect 220. For example, user I/O devices 252 may comprise one or more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. The mass storage unit 216 is coupled to the CPU 210 via the interconnect 220. A network interface 218 is configured to transmit and receive packets of data via the communications network 150. In one embodiment, the network interface 218 is configured to communication using the well-known Ethernet standard. The network interface 218 is coupled to the CPU 210 via the interconnect 220.

The memory subsystem 230 includes programming instructions and data that comprise an operating system 232. The operating system 232 performs system management functions such as managing hardware devices including the network interface 218, mass storage unit 216, I/O device interface 214, and graphics subsystem 212. The operating system 232 also provides process and memory management models for a user interface 234 and a playback application 236. The user interface 234 provides a specific structure, such as a window and object metaphor, for user interaction with content player 110. Persons skilled in the art will recognize the various operating systems and user interfaces that are well-known in the art and suitable for incorporation into the content player 110.

The playback application 236 is configured to retrieve a digital content file from a CDN 140 via the network interface 218 and play the digital content file via the graphics subsystem 212 and display device 250. The playback application 236 requests a CDN list 240, such as CDN list 122 of FIG. 1, from the content directory server 120. The playback application 236 selects a CDN from the CDN list 240, as described in greater detail below in FIG. 3B. The playback application 236 then proceeds to download and buffer the digital content file from a selected CDN 140. The playback application 236 generates a viewable rendering of the digital content file to a user during a playback process, as described in greater detail below in FIGS. 3-7.

An audio buffer 242 may be used to store audio data from a piece of digital content downloaded from the selected CDN 140. In one embodiment, an audio decoder 244 is used to decode data stored in the audio buffer 242 into one or more audio tracks. A video buffer 246 is used to store video data from a piece of digital content downloaded from the selected CDN 140. A video decoder 248 is used to decode and render data stored in the video buffer 246 into one or more sequences of viewable video frames. The content buffer 245 may provide a unified buffer structure, including the audio buffer 242 and video buffer 246. In such a case, the audio data and video data are structured into a single stream. Alternatively, the content buffer 245 may configure the audio buffer 242 and video buffer 246 as separate buffers that may be accessed independently for adding or removing data.

As noted above, the playback application 236 may be configured to establish a network connection with multiple content servers (or multiple connections with a single content server) and download different chunks of a digital content file in parallel. In one embodiment, the playback application 236 is configured to collect and update connection statistics 241 regarding the prevailing bandwidth conditions experienced between the content player 110 and each such network connection. The connection statistics 241 may be updated periodically at regular intervals or upon the occurrence specified events (e.g., a chunk completes downloading over a given connection). In one embodiment, the scheduling statistics 241 may be used to decide whether to continue to use a given network connection. For example, if the network connection between the content player and one of the content servers falls below a specified threshold (or is performing poorly relative to other connections during a given session) then that connection may be killed. In such a case, a replacement connection may be selected from the CDN list 240 or the digital content file may continue to be streamed using the remaining connections. Further, as described in greater detail below, the connection statistics 241 may be evaluated by the playback application 236 as part of selecting what connection to use to download a given chunk of a digital content file being streamed to the content player 110.

Figure 3:
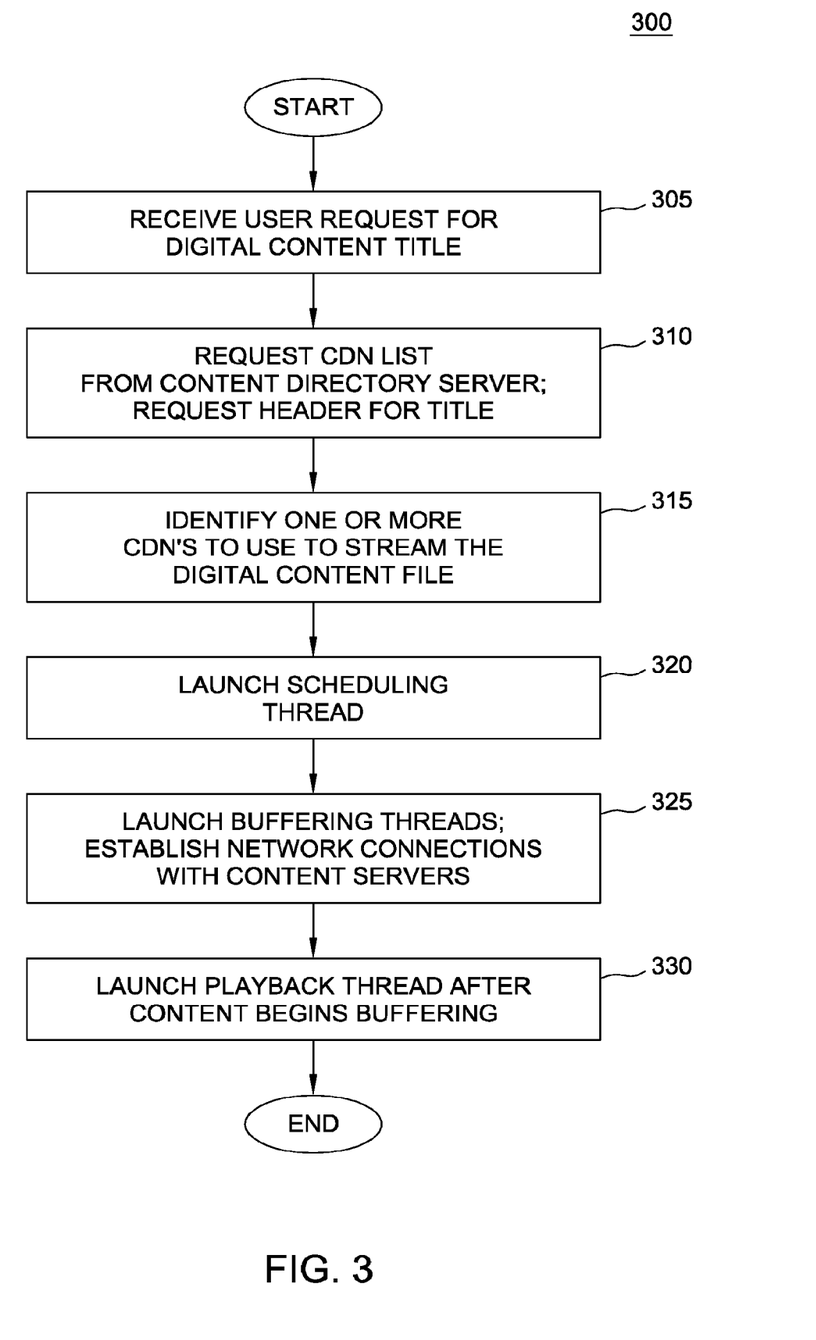
FIG. 3 illustrates a method for downloading a digital content file from a content distribution network, according to one embodiment of the invention.

FIG. 3 illustrates a method 300 for streaming a digital content file from a content distribution network 140, according to one embodiment of the invention. Although the method steps are described in conjunction with the systems of FIGS. 1 and 2, persons skilled in the art will understand that any system configured to perform the method steps, in any order, is within the scope of the invention.

As shown, the method 300 begins at step 305, where the playback application 236 receives a user request to play a selected digital content title. For example, the user may enter a selection using one or more of the user I/O devices 252 of FIG. 2, such as a keyboard or mouse, remote control, or panel controls integrated with content player 110. At step 310, the playback application 236 requests a CDN list 122 for the selected digital content file from the content directory server 120 via a title lookup request 112. In one embodiment, the content directory server 120 may be accessed over in a communications network using, e.g., a URL known to the content player 110. As noted above, the CDN list 122 may provide a list of URLs, each corresponding to a content server from which the requested title is available.

In addition to the request for the CDN list 122, the playback application 236 may request metadata describing a layout of the requested digital content file. The metadata may provide a list of portions of the file (i.e., a list of chunks) and provide a layout of the file indicating the position of each chunk, e.g., as a byte offset into the file. Each chunk may represent a distinct segment of audio/video data of the media file. For example, in one embodiment, each digital content file may be encoded using the known MPEG-2 encoding standard. In such a case, each chunk of the encoded digital content file may include a sequence of GOPs corresponding to, e.g., two to three seconds of encoded video data, referenced relative to the byte position of a given GOP in the file. As is known, a "GOP" refers to a group of successive pictures within a coded video stream from which the visible frames are generated, and a GOP is usually about 15 frames long in an NTSC system. Of course, MPEG-2 provides just one example of an encoding standard and others may be used.

Additionally, the digital content file may be encoded using a variety of different bit-rates, resulting in a different file size (and byte offset position) for the chunks in each encoding at a distinct bit-rate. In one embodiment, the playback application 236 may select what bit-rate to request based on prevailing bandwidth conditions and the bit rates supported by the content player 110. Further, the playback application 236 may be configured to switch from one bit-rate encoding to another, based on changes in the prevailing bandwidth conditions. In such a case, the playback application 236 may request the metadata specifying a index of chunks and byte offsets for each available bit-rate encoding.

In one embodiment, the metadata describing the chunks of a given digital content file may be stored as a file retrieved from the content directory server. Alternatively, the metadata may be included as a header in each copy of the digital content file. However, as the byte offset positions are the same in each copy of the file (for encodings at the same bit-rate), the content player 110 may be configured to retrieve only one copy of the header (or one copy for each available bit-rate encoding) rather than obtain a duplicate from multiple copies.

Once retrieved, at step 315, the playback application 236 may select one or more CDNs to use to stream the digital content file. While any number of connections may be used, the use of three connections has proven to be effective. Using this as an example, the playback application 236 may establish three distinct network connections with the same content server, establish three connections with different servers in the same CDN, or establish three connections using content servers in distinct CDNs (or combinations thereof). The particular approach used for selecting both how many connections to establish, and which content servers and/or CDNs to use may be tailored suit the needs of a particular case. However, the selection may be based on factors such as, without limitation, customer identity, content title, internet service provider identity, geographic location of the content player 110, customer history, or prevailing server load or network latency, or any combination thereof.

At step 320, the playback application 236 may launch a scheduling thread. The scheduling thread may provide a unit of execution within the playback application 236 configured to manage the connections between the content player 110 and the content servers selected at step 315. The scheduling thread may also gather bandwidth statistics used to help determine which connection to use to download any given chunk. In one embodiment, a buffering thread may be created for each connection. Each buffering thread may be configured to download chunks (as assigned by the scheduling thread) and store the resulting audio video data in the content buffer 245. The scheduling thread may use a simple round-robin approach where, so long as the audio/video data stored in the content buffer 245 is below a threshold, an idle buffering thread is assigned the next sequential chunk of the digital content file to download from the content server. However, in one embodiment, a predictive multi-connection scheduling approach (described relative to FIGS. 4 and 5A-5C) is used to increase the throughput obtained from using the multiple network connections to stream the digital content file.

At step 325, the playback application 236 may launch the buffering threads. In turn, each buffering thread may establish a network connection with one of the content servers and begin downloading a chunk of the digital content file assigned by the scheduling thread. For example, in one embodiment, the chunks themselves may be requested using HTTP range requests—by specifying the range of bytes from the digital content file corresponding to a given chunk in the header of an HTTP request message. Of course, other approaches may be used. As the chunks are downloaded, the data may be stored in the content buffer 245.

At step 330, the playback application 236 may launch a playback thread after a specified amount of data has accumulated in the content buffer 245. The precise amount of buffered data may be tailored to suit the needs of an individual case, e.g., based on the prevailing bandwidth conditions and the average encoded bit-rate of the digital content file. Once playback begins, the playback application 236 may continue to download chunks of the digital content file from the multiple network connections, store the downloaded chunks in the content buffer, and decode and playback audio/video data until the complete file has been streamed to the content player 110.

Figure 4:
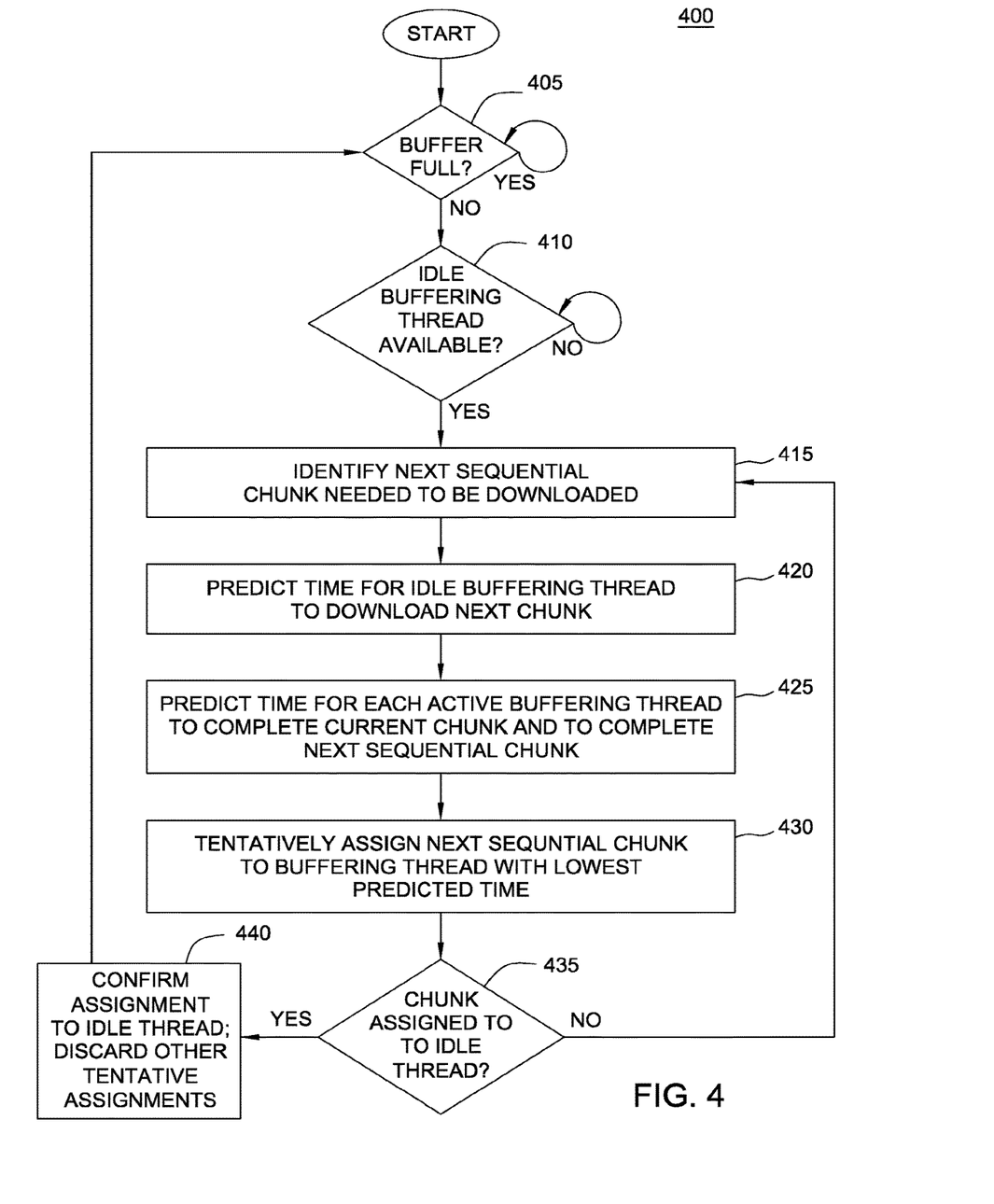
FIG. 4 illustrates a method for a content player to select a content server from which to request a chunk of audio/video data, according to one embodiment of the invention.

FIG. 4 illustrates a method 400 for a content player 110 to select a content server from which to request a chunk of audio/video data, according to one embodiment of the invention. In a particular embodiment, the scheduling thread of the playback application 236 discussed above may perform the method 400 to determine which of multiple network connections to use to download a particular chunk of a digital content file. Of course, persons skilled in the art will understand that any system configured to perform the method steps, in any order, is within the scope of the invention.

As shown, the method 400 begins at step 405, where the scheduling thread determines whether the content buffer 245 is full. Note, the content buffer 245 may not have, strictly speaking, a maximum capacity. Instead, a target amount of data for the buffer may be specified after which additional chunks of the digital content file are not downloaded until the amount of data in the content buffer 245 falls below the target value. In such a case, when the amount of data in the content buffer 245 reaches the target value, active buffering threads continue to download data stored in the content buffer 245, but additional chunks do not begin downloading.

If the content buffer 245 is not full, then at step 410, the scheduling thread determines whether there is an idle buffering thread (i.e., a thread not actively downloading a chunk of the digital content file). If all the buffering threads are downloading a chunk, then the scheduling tread may simply wait until one becomes available. Of course, initially, the content buffer 245 is empty and none of the buffering threads are active. Accordingly, the scheduling thread may initially assign the first sequential N chunks of the digital content file to N buffering threads, one per connection.

As these chunks download, the scheduling thread may monitor the bandwidth experienced by each buffering thread and use this information to select which chunk a given buffering thread should download when it becomes available as well as whether to continue using a given connection.

Figure 5A:
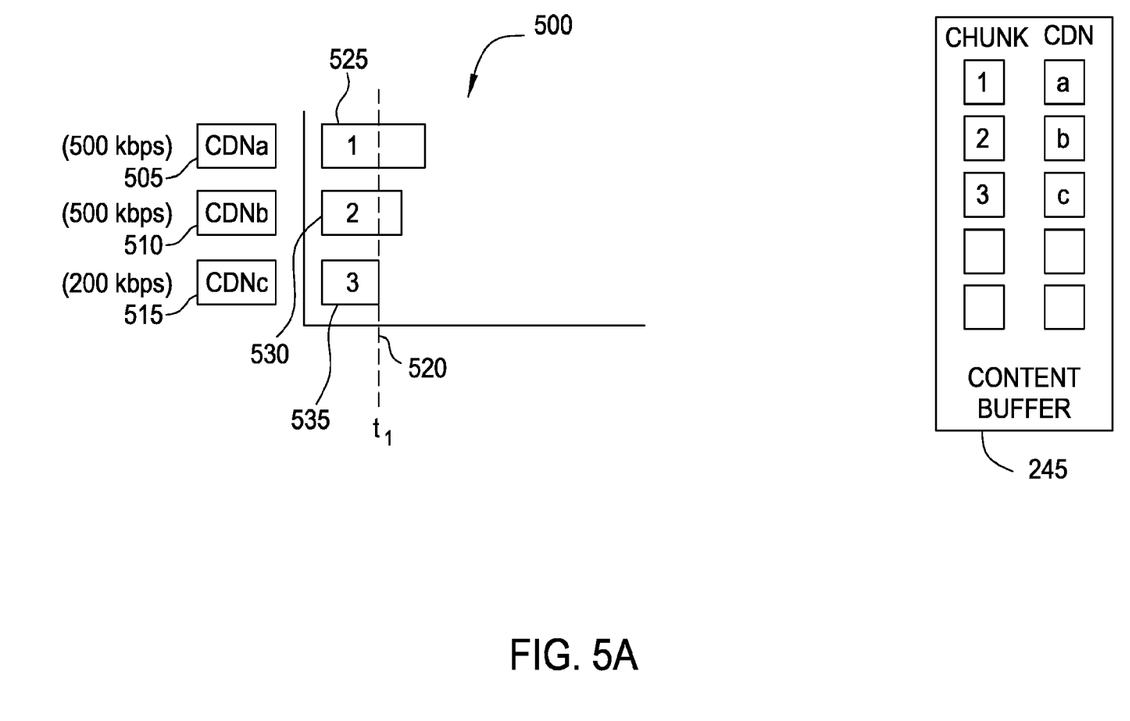
FIG. 5A-5C illustrates an example of a content player streaming a digital content file, in parallel, using multiple network connections, according to one embodiment of the invention.

At step 415, once a buffering thread becomes available (i.e., once a chunk completes downloading over one of the network connections), the scheduling thread identifies the next sequential chunk in the digital content file to download. An example of steps 410 and 415 are illustrated in FIG. 5A. In particular, FIG. 5A illustrates an example timing diagram 500 for a digital content file being streamed to a content player, according to one embodiment of the invention. As shown, a digital content file is being downloaded from three CDNs, CDNa 505, CDNb 510, and CDNc 515. CDNa 505 is downloading chunk 1 525 and CDNb 510 is downloading chunk 2 530. The partially downloaded content of chunk 1 525 and chunk 2 530 and the fully downloaded content of chunk 3 535 is stored in the content buffer 245.

As further shown, CDNc, 515 completes downloading chunk 3 535 at time $t_1$ 520. Thus, at time $t_1$ 520, the buffering thread with the connection to CDNc 535 becomes idle (step 410). In response, the scheduling thread determines that the fourth chunk is the next sequential chunk to download (step 415). Additionally, the scheduling thread has determined that CDNa 505 and CDNb 510 are experiencing an average download speed of 500 kbps, while CDNc 515 is experiencing a slower speed of only 200 kbps.

Returning to the method 400 shown in FIG. 4, at step 420, the scheduling thread predicts the time required for the idle buffering thread to download the next chunk of the digital content file. The prediction may be based on the most recent evaluation of the bandwidth experienced using the network connection between the idle buffering thread and corresponding content server and the byte size of the next chunk of the digital content file.

Similarly, at step 425, the scheduling thread predicts the time required for each active buffering thread to complete downloading a current chunk and to complete downloading the next sequential chunk. Like the prediction made for the idle buffering thread (step 420), the prediction for the active buffering threads may be based on the bandwidth statistics collected for each active buffering thread as well as the byte size that remains for the current chunks and the byte size of the next chunk of the digital content file.

Figure 5B:
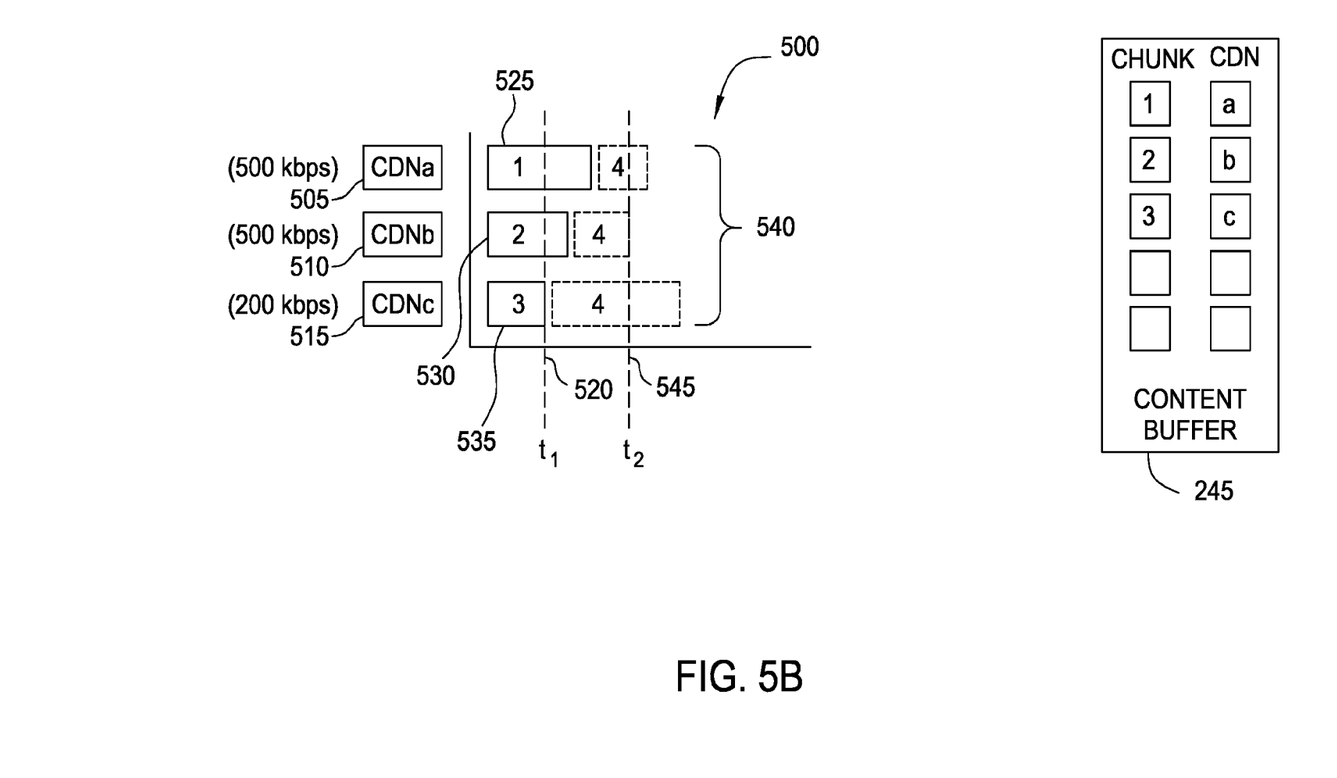

Steps 420 and 425 are further illustrated in FIG. 5B. In particular, FIG. 5B shows the timing diagram 500, along with the predictions 540 for how long it will take each of CDNa 505, CDNb 510, and CDNc 515 to complete downloading the fourth chunk of the digital content file. In this example, the predictions 540 indicate that CDNb 510 would be able complete downloading chunk 2 530 and downloading the fourth chunk at time $t_2$ 545, more quickly than the fourth chunk would complete downloading using the network connection to either CDNa 505 or CDNc 515.

At step 430, the scheduling thread tentatively assigns the next sequential chunk to be downloaded using the network connection with the lowest predicted time. In the example of FIGS. 5A-5B, the scheduling thread tentatively assigns the fourth chunk of the digital content file to be downloaded over the network connection to CDNb 510. The assignment remains tentative as the method 400 is used to determine what chunk can be downloaded most efficiently using the idle thread. Accordingly, at step 435, the scheduling thread determines whether the tentative assignment provides a chunk for the idle buffering thread to download. In the example FIG. 5B, the fourth chunk is predicted to be more efficiently downloaded using the active buffering thread downloading chunk 2 530 over the network connection to CDNb 510. Thus, the method 400 returns to step 415, where the scheduling thread again identifies the next sequential chunk needed to be downloaded.

Figure 5C:
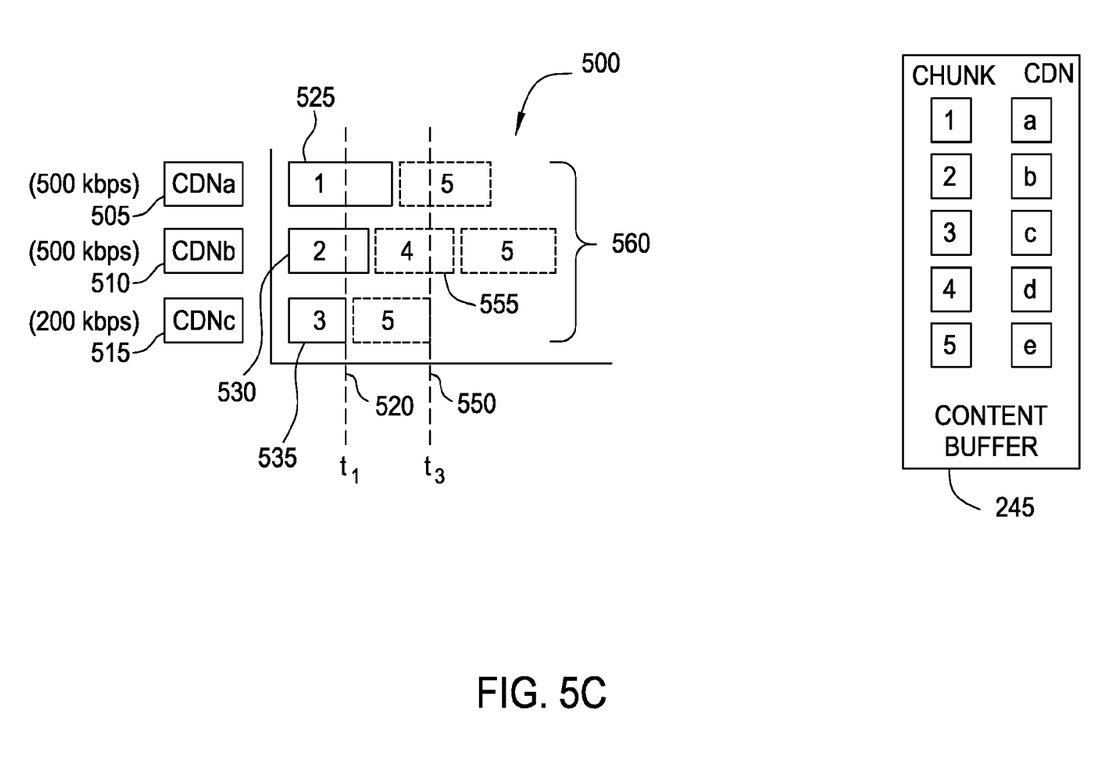

As the scheduling thread has tentatively assigned the fourth chunk to be downloaded using the connection to CDNb 510, the fifth chunk is identified as the next sequential chunk. Next, the scheduling thread again predicts how long for it would take for the idle buffering thread and for each the active buffering thread to download the fifth chunk (steps 420 and 425). FIG. 5C illustrates this result, where a tentative assignment of chunk 4 555 is made to CDNb 510, and a prediction 560 is made representing how long it will take each of CDNa 505, CDNb 510, and CDNc 515 to complete downloading the fifth chunk of the digital content file. In this example, the predictions 560 indicate that CDNc 515 would be able complete downloading the fifth chunk at time $t_3$ 550, more quickly than using either of CDNa 505 or CDNb 510. Accordingly, the scheduling thread tentatively assigns chunk 5 to the buffering thread connected to CDNc 515 (step 430) and determines that a chunk has now been assigned to the idle buffering thread (step 435).

At step 440, the scheduling thread confirms the tentative assignment made to the idle buffering thread and discards any other tentative assignments made during the evaluation. In the example of FIG. 5C, the assignment of the fifth chunk to CDNc 515 is confirmed and the buffering thread associated with this begins downloading the fifth chunk and storing data in the content buffer 245. At the same time, the tentative assignment of chunk 4 555 to CDNb 510 is discarded. Note, a scenario could develop where a sequence of idle threads are each assigned a chunk out of sequence, leaving a gap in the chunks downloaded to the content player. Accordingly, in one embodiment, the scheduling thread may first determine whether assigning an idle thread to download a chunk out of sequence could lead to a buffer under-run, and if so, assign the next sequential chunk to an idle thread without regard for the predictions made at steps 420 and 425.

Figure 6:
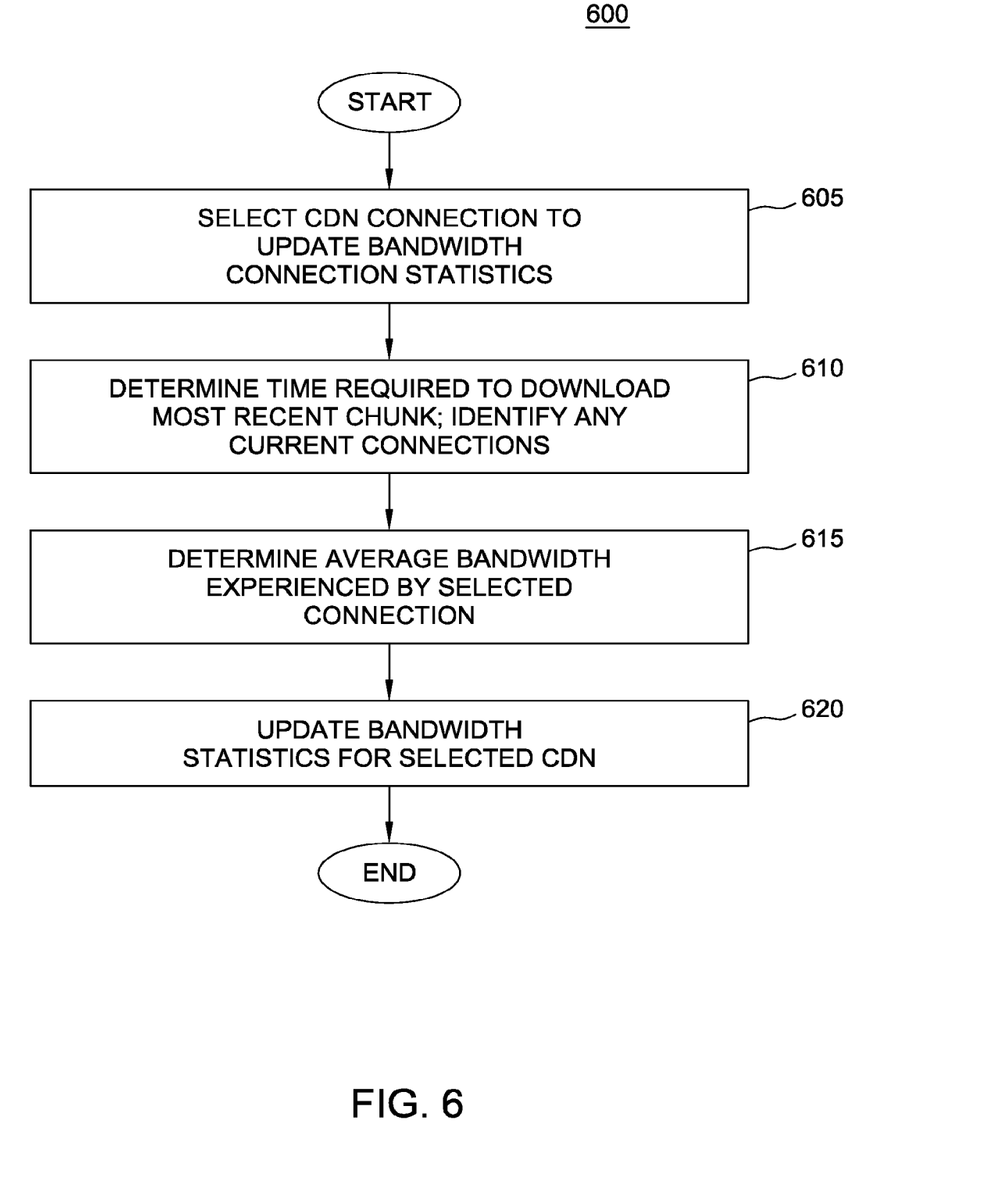
FIG. 6 illustrates a method for updating bandwidth connection data for a given connection between a content player and a content distribution network, according to one embodiment of the invention.

FIG. 6 illustrates a method 600 for updating bandwidth connection statistics for a given connection between a content player and a content distribution network, according to one embodiment of the invention. As shown, the method 600 begins at step 605, where the content player 236 selects to update the connection statistics 241 for one of the network connections being used to download a digital content file. As noted above, the connection statistics 241 may be updated periodically at regular intervals while a file is being streamed or upon the occurrence specified events. For example, the connection statistics 241 may determine the average bandwidth experienced by a given connection while downloading a given chunk, taking into account any chunks being downloaded concurrently by other connections. In one embodiment, the connection statistics 241 may simply reflect the most recent measure of the bandwidth experienced by a given connection while downloading the most recent chunk. Alternatively, the connection statistics 241 for a given connection may reflect a weighted average blending the most recent measure of the bandwidth with previous measurements.

At step 610, the content player 236 may determine how long it took to download the most recent chunk over the selected connection along with the number bytes of data present in the most recent chunk. Additionally, the content player 236 may identify whether any concurrent connection were being used to download other chunks of the digital content file.

At step 615, a measure of bandwidth is determined for the selected connection, adjusted to account for any concurrent network connections used while the most recent chunk was downloaded by the selected network connection. The measure of bandwidth needs to take into account the concurrent connections (if any) as the multiple network connections share the same data communications channel (e.g., a user's DSL or cable broadband internet connection). That is, the bandwidth experienced by one network connection is impacted by other connections use of the same communication channel. Once determined, the connection statistics for a given connection are updated.

Figure 7:
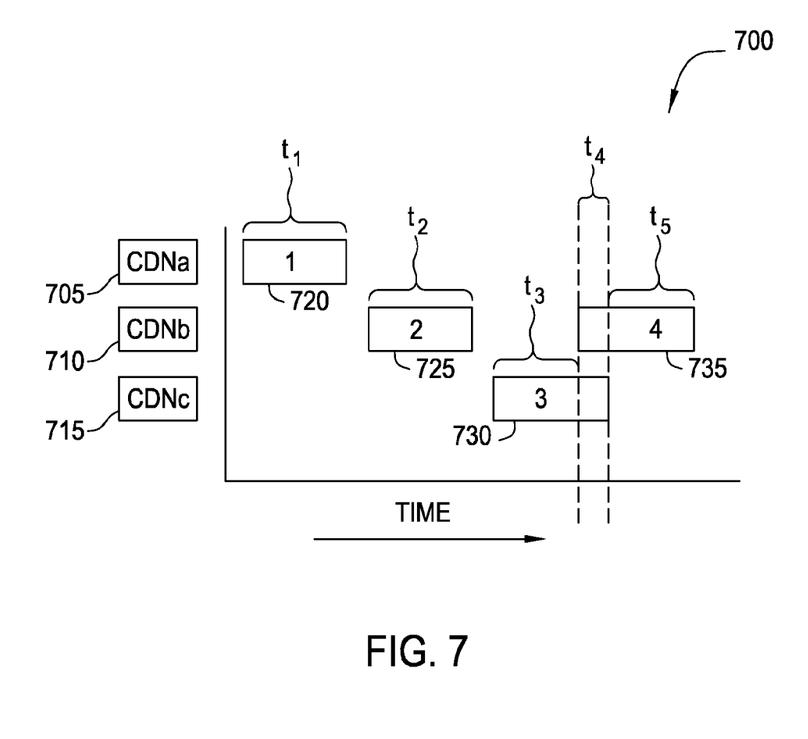
FIG. 7 illustrates an example of a content player updating bandwidth connection data for a given connection between a content player and a content distribution network, according to one embodiment of the invention.

For example, FIG. 7 illustrates a timing diagram 700 for a digital content file being streamed to a content player. Assume for this example, that the content player has been downloading a digital content file from three distinct content servers: one using a network connection with CDNa 705, another using a network connection with CDNb 710, and a third using a network connection with CDNc 715.

As shown, the connection with CDNa 705 required a time period of $t_1$ to download the bytes in a first chunk 720 and the connection with CDNb 710 required a time period of $t_2$ to download the bytes in second chunk 725. Illustratively, the first and second chunks 720 and 725 were downloaded without any concurrent connections. Thus, the expected bandwidth available from CDNa 705 may be computed as the ratio of the number of bytes in chunk 1 720 to the time value $t_1$. Similarly, a first measure of the expected bandwidth available from CDNb 710 may be computed as the ratio of the number of bytes in the second chunk 725 to the time value $t_2$. Or more simply the ratio of bytes to unit time (e.g., seconds).

However, a download of a third chunk 730 (using the connection with CDNb 710) and a download of a fourth chunk 735 (using the connection with CDNc 715) overlap with one another. In one embodiment, the expected bandwidth available from a connection used concurrently with others may be computed as a ratio of the total number of bytes in a chunk to the sum of a time period with no concurrent chunks being downloaded (if any) and a second time period multiplied by the number of concurrent connections. Thus, for the third chunk 730 in the timing diagram 700, the expected bandwidth available from CDNc 715 may be computed as follows:

$$\frac{b_1}{t_3 + 2t_4}$$

where $b_1$ is the number of bytes in the third chunk 730 and $t_3$ and $t_4$ are the time periods labeled in timing diagram 700. Similarly, a second measure of the bandwidth for CDNb 710 may be computed as:

$$\frac{b_2}{2t_4 + t_5}$$

where $b_2$ is the number of bytes in the fourth chunk 735 and $t_4$ and $t_5$ are the time periods labeled in timing diagram 700. Of course, if a third (or more) concurrent connections are present for a period of overlap, additional terms may be added to these equations as appropriate.

One embodiment of the invention may be implemented as a program product stored on at least one computer-readable storage medium residing within the content player 110. In such an embodiment, the content player 110 comprises an embedded computer platform such as a set top box, and the stored program product enables the methods of FIGS. 3, 4, and 6 to be performed by the content player 110. In an alternative embodiment, a program product may be downloaded to a memory within a computer device. For example, the downloaded program product may be executable instructions embedded within an internet web site. In such an embodiment, the content player 110 comprises the computer device, and the downloaded program product enables the methods of FIGS. 3, 4, and 6 to be performed by the content player 110.

In sum, a technique for playing digital content file on a content player 110 is disclosed using multiple network connections to download portions of a media file, in parallel. By creating multiple network connections, a better throughput is obtained for streaming the media file to the content player. To stream the media file, the content player downloads a file header associated with a given title, establishes a network connection with multiple content servers (or multiple network connections with a single content server or both) and begins requesting portions of the digital file. In response, the content servers transmit the requested portions to the content player. As described above, the content player may employ a predictive multi-connection scheduling approach to determine which network connection to use in downloading a given chunk. Once received, the chunks may be stored in a buffer prior to being decoded and played back.

Advantageously, the predictive multi-connection scheduling approach maximizes the throughput of data for streaming the media file to the client, which may allow higher bit-rate encodings to be streamed, as well as reduce the occurrence of buffer under-runs, thereby improving the overall user experience.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method, comprising:
   establishing a plurality of network connections with one or more content servers for downloading a digital content file, wherein the one or more content servers are included in a list of content servers hosting a copy of the digital content file;
   receiving metadata describing a plurality of portions of the digital content file;
   selecting a first portion of the digital content file to be downloaded;
   downloading the first portion of the digital content file from at least one of the one or more content servers via an idle network connection according to the metadata; and
   storing the downloaded first portion of the digital content file in a content buffer for play back.

2. The method of claim 1, wherein selecting the first portion of the digital content file to be downloaded comprises assigning a next sequential portion to be downloaded via the idle network connection.

3. The method of claim 1, wherein each portion of the digital content file comprises a distinct portion of audio/video data.

4. The method of claim 3, wherein each distinct portion of audio/video data comprises an MPEG-2 encoded sequence of one or more groups of picture (GOPs).

5. The method of claim 1, further comprising terminating a first network connection included in the plurality of network connections upon determining that the first network connection has slowed below a threshold level.

6. The method of claim 5, further comprising establishing an additional network connection with one of the one or more content servers to replace the first network connection.

7. The method of claim 1, further comprising, prior to selecting the first portion of the digital content file to be downloaded, determining that an amount of data in the content buffer is below a threshold.

8. A non-transitory computer-readable storage medium including instructions that, when executed by a processor, cause the processing unit to download data from a digital content file, by performing the steps of:
   establishing a plurality of network connections with one or more content servers for downloading the digital content file, wherein the one or more content servers are included in a list of content servers hosting a copy of the digital content file;
   receiving metadata describing a plurality of portions of the digital content file;
   selecting a first portion of the digital content file to be downloaded;
   downloading the first portion of the digital content file from at least one of the one or more content servers via an idle network connection according to the metadata; and
   storing the downloaded first portion of the digital content file in a content buffer for play back.

9. The non-transitory computer-readable medium of claim 8, wherein selecting the first portion of the digital content file to be downloaded comprises assigning a next sequential portion to be downloaded via the idle network connection.

10. The non-transitory computer-readable medium of claim 8, wherein each portion of the digital content file comprises a distinct portion of audio/video data.

11. The non-transitory computer-readable medium of claim 10, wherein each distinct portion of audio/video data comprises an MPEG-2 encoded sequence of one or more groups of picture (GOPs).

12. The non-transitory computer-readable medium of claim 8, further comprising terminating a first network connection included in the plurality of network connections upon determining that the first network connection has slowed below a threshold level.

13. The non-transitory computer-readable medium of claim 12, further comprising establishing an additional network connection with one of the one or more content servers to replace the first network connection.

14. The non-transitory computer-readable medium of claim 8, further comprising, prior to selecting the first portion of the digital content file to be downloaded, determining that an amount of data in the content buffer is below a threshold.

15. A content player device, comprising:
   a processor; and
   a memory that is coupled to the processor and includes a content buffer for storing downloaded digital content and a playback application, wherein, when executed by the processor, the playback application is configured to:
      establish a plurality of network connections with one or more content servers for downloading the digital content file;
      receive metadata describing a plurality of portions of the digital content file;
      select a first portion of the digital content file to be downloaded;
      download the first portion of the digital content file from at least one of the one or more content servers via an idle network connection according to the metadata;
      and store the downloaded first portion of the digital content file in the content buffer for play back.

16. The content player device of claim 15, wherein selecting the first portion of the digital content file to be downloaded comprises assigning a next sequential portion to be downloaded via the idle network connection.

17. The content player device of claim 15, wherein each portion of the digital content file comprises a distinct portion of audio/video data.

18. The content player device of claim 17, wherein each distinct portion of audio/video data comprises an MPEG-2 encoded sequence of one or more groups of picture (GOPs).

19. The content player device of claim 15, further comprising terminating a first network connection included in the plurality of network connections upon determining that the first network connection has slowed below a threshold level.

20. The content player device of claim 19, further comprising establishing an additional network connection with one of the one or more content servers to replace the first network connection.

21. The content player device of claim 15, further comprising, prior to selecting the first portion of the digital content file to be downloaded, determining that an amount of data in the content buffer is below a threshold.

* * * * *